Oct. 18, 1938.   J. D. WALLACE ET AL   2,133,880
FISHING LINE FLOAT
Filed July 1, 1937

Inventors:
J. D. Wallace
M. V. Sullenger

By— Horace B. Neale
Attorney.

Patented Oct. 18, 1938

2,133,880

UNITED STATES PATENT OFFICE 2,133,880

FISHING LINE FLOAT

Jefferson D. Wallace and Merle V. Sullenger, Kansas City, Mo.

Application July 1, 1937, Serial No. 151,488

5 Claims. (Cl. 43—17)

Our invention relates to fishing tackle, and has particular reference to the provision of a bob or float of that type having a signal in the form of an electric light in a circuit including a switch or make and break device operated by the fish through the medium of a hook and line connected to the switch.

Bobs or floats of this general character are employed for fishing in the nighttime, for the reason that it is usually too dark for the angler to see the float, but by providing a signal light operated by the fish pulling on the hook and line indication that the fish has been caught will be given to the angler in practically the same manner as the bobbing of the float, and by providing means, as an auxiliary switch, for keeping the circuit open when the float is not in use it prevents the battery from being run down by accidental closing of the working switch.

Appreciating the utility of a bob or float having a visible signal in the form of an electric light it is the main purpose of our invention to provide a simplified construction that will present a comparatively small device of this kind to be effective not only in its operation in catching fish but also as to the assembling of the parts permitting access to the battery and electric bulb for renewing these elements of the float.

Another important object of our invention is to provide a working switch for the circuit to the bulb or lamp which can be easily adjusted to require a more or less pull on the hook and line according to the size of fish for which the fisherman is angling, as well as effect adjustment according to the weight of the line and hook connected to said switch.

Our invention further contemplates a particular construction of circuit make and break device or electric switch operated by the fish, whereby said switch is adapted to also provide for maintaining the switch open against accidental closing thereof when the float is not in actual use, thus producing a switch having a dual purpose.

Other objects and advantages of our invention will be apparent from the following description of the construction and operation of our improved form of float for fishing lines, and what we claim as new and desire to protect by Letters Patent is more specifically set forth in the appended claims:

Figure 1:
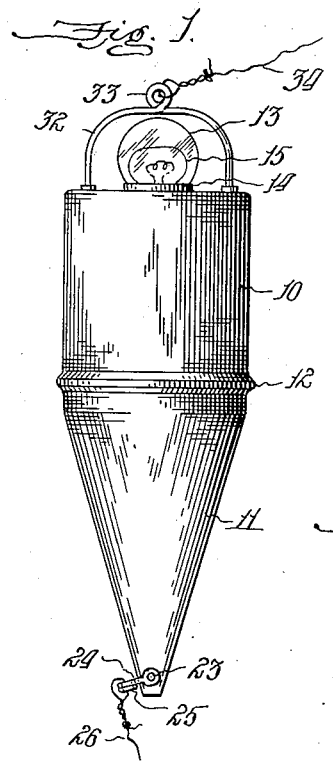
Figure 1 is a side elevation of a bob or float in accordance with our invention.

In carrying out our invention the hollow bob or float is made in two sections 10, 11 detachably connected together in any suitable manner, preferably by means of screw threads as shown in the drawing, with the adjoining ends of the sections provided with shoulders for clamping a packing ring or gasket 12 between them. The float or casing is of a conventional shape, that is, the upper half is cylindrical and the lower half tapered therefrom to a point, and in addition to the packing ring or gasket for providing a water tight joint we provide a glass dome 13 at the top which is also made water tight by cementing the lower end thereof in a ring 14 formed integrally with the upper section of the float. This dome is of transparent material, as glass, and receives the electric light bulb 15 of the signal device into the open inner end thereof. As will be noted, this construction provides a two-part water tight float for containing the elements of the signal device, which may be readily separated for renewal of those elements that may need replacing, as well as for adjustment of the switch hereinafter described.

Figure 2:
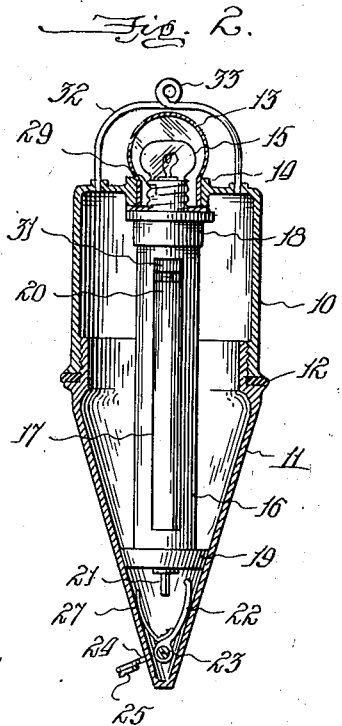
Fig. 2 is a longitudinal vertical sectional view through the float.
Figure 5:
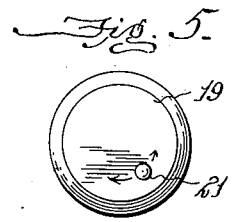
Figs. 5 and 6 are bottom plan views of a turnable support for one of the terminals of the switch forming contact with a pole of the battery.
Figure 3:
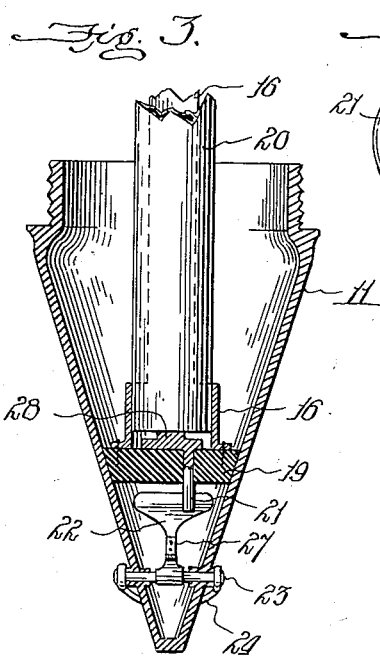
Fig. 3 is an enlarged detail sectional view through the lower part of the float or one of the sections thereof.
Figure 6:
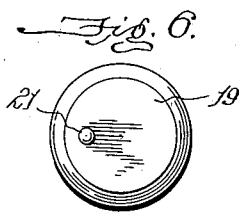

The bulb 15 is carried by a battery casing in the form of a tube 16 having sight openings 17 at opposite sides thereof, the bulb being attached to a cap 18 forming a closure for the upper end of the tube, while at the lower end of the tube there is a disk 19 for engagement with the inner wall of the tapered lower section of the float for positioning the tube and battery 20 at the center of said float, the disk being of greater diameter than the tube for proper engagement with the float. In order that the disk may firmly support the tube, battery, and bulb in place the periphery thereof is beveled to correspond with the taper of the lower section of the casing or float for the fishing line, and of course by making this disk of resilient material, as rubber, it will better hold to the inner side of the float. However, the disk is of insulating material for the reason that it supports a terminal, 21, of a switch or make and break device for the electric circuit furnished by the battery with one of the poles of which said terminal is in contact, the other element of said switch being in the form of a pivoted lever, 22. The ends of the pivot pin 23 to which the switch lever is fixed extend through the sides of the float for the attachment of the operating member in the form of a loop 24 with an eye 25 to which the line 26 carrying the hook (not shown) is fastened. The pivoted switch lever is held normally away from the terminal 21 by a flat spring 27 secured to said lever and bearing against the opposite side of the float from that against which the lever bears in its normal position, and it will be apparent, by reference to Fig. 2, that a pull on the operating member or loop 24 of the switch lever will swing the said lever against the terminal to close the switch. Now in order to vary the force or pull required to close the switch against the action of the spring the terminal 21 is movable to a greater or less distance from the switch lever 22 in its normal position, the movement or adjustment being effected in this instance by turning the disk, inasmuch as said terminal is connected to the disk at one side of the axis thereof, as shown in Figs. 5 and 6. For contact with the battery the terminal extends through the disk and has a contact piece 28 at the upper side thereof within the battery supporting tube 16 and on which the battery rests.

Figure 4:
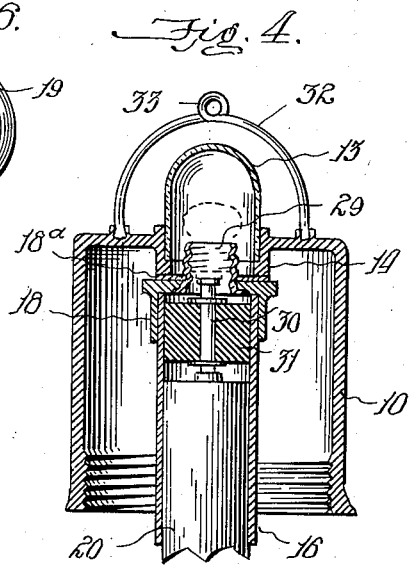
Fig. 4 is a similar view through the upper part of the float or section.

The switch connects one pole of the battery with the casing, or ground, which connects with the electric light bulb through said casing and socket 29 in which the bulb is screwed, the other pole of the battery, at the upper end thereof, being connected to the other terminal of the electric light bulb by an interposed connector 30 (Fig. 4) extending through a filling piece 31 within the supporting tube between the battery and bulb. It will be seen that when the switch is closed the current will pass from one pole of the battery to and through the electric light bulb, as by connector 30, and then by way of the float casing to and through the switch to the other pole of the battery by the terminal or conenctor 21. The particular form of switch described also provides for maintaining the switch open to prevent its being accidentally closed during the time the float is not in actual use, that is when boxed for sale and when stored in a kit. In this instance the battery supporting tube, to which the disk and terminal are rigidly connected, is turned to position the terminal 21 at its farthest point from the switch-lever (Fig. 5), and as the throw of the switch lever to open circuit position is limited by contact of the operating member or loop 24 thereof with the lower end portion of the float said switch lever cannot reach the terminal in this position. The limit of movement may be to the center of the axis of the disk, or a slight distance beyond, so as to provide for an ample range of adjustment of terminal 21 in respect to the weight of the hook and line and size of fish for which the angler is fishing, and of course the strength of the spring is also a controlling factor. Consequently the particular form of our switch obviates the necessity of an auxiliary safety switch in a device of this character.

For the attachment of the line extending from the fishing rod the upper end of the float is provided with a bail 32 having an eye 33 to which the line is attached, and this bail also serves as a cage to protect the glass dome in which the electric light bulb is housed.

The operation of our improved float will be readily understood from the foregoing description in connection with the accompanying drawing, for when a fish grips the bait on the hook and tugs on the line connected to the operating member 24 of the switch lever it will close the electric switch so that the current will pass through the bulb and produce a signal light, the duration of the light indicating to the angler the extent to which the fish is caught on to the bait and hook.

We have shown and described the preferred embodiment of our invention, and it will be understood that modifications of the general construction, as well as modification of the construction of electric switch for closing the circuit, may be made within the spirit and scope of our claims.

We claim:—

1. A float for fishing lines comprising a casing made up of two sections detachably connected together by a water tight joint, and a transparent dome attached centrally to the top of the upper section by a water tight joint, the lower section of the float being tapered to its lower end; together with a tube having a disk of resilient material adapted to engage the tapered portion of the float for supporting said tube centrally within the casing, a battery within the tube, an electric light bulb supported at the upper end of the tube so as to project into the aforementioned dome, an electric switch, and means for operating the switch connected to the hook and line, said switch and light bulb being included in a circuit with the battery.

2. A float for fishing lines comprising a casing made up of two sections detachably connected together by a water tight joint, the lower section of the casing being tapered downwardly, a tube to receive an electric battery, an electric light bulb secured to the float and exposed to provide a signal light, a disk of resilient material secured to the lower end of the tube to frictionally engage the tapered portion of the casing for supporting said tube centrally therein and for rotatable movement, and an electric switch included in a circuit with the battery and electric light bulb, said switch comprising a pivoted lever spring-actuated to open circuit position and an electric terminal projecting from one side of the axis of the aforementioned turnable disk; together with means for limiting the throw of the lever whereby the terminal may be moved into an inoperative position, the line carrying the hook being connected to the lever for operating said lever against the action of the spring.

3. A float for fishing lines comprising a casing made up of two sections detachably connected together by a water tight joint, the lower section of the casing being tapered downwardly, a tube to receive an electric battery, an electric light bulb secured to the casing and exposed to provide a signal light, a disk of resilient material secured to the lower end of the tube to frictionally engage the tapered portion of the casing for supporting said tube centrally therein and for turnable movement, and an electric switch included in a circuit with the battery and electric light bulb, said switch comprising a pivoted lever and a terminal, the lever being spring actuated to open circuit position and the terminal extending from the aforementioned disk at one side of the axis thereof, whereby said terminal may be adjusted with respect to the lever to require a more or less pull on the latter in closing the circuit, the line carrying the hook being attached to the lever for operating the same against the action of the spring.

4. A float for fishing lines comprising a casing made up of two sections detachably connected together by a water tight joint, the lower section of the casing being tapered downwardly, a tube to receive an electric battery, an electric light bulb secured to the casing and exposed to provide a signal light, a disk of resilient material secured to the lower end of the tube to frictionally engage the tapered portion of the casing for supporting said tube centrally therein and for turnable movement, and an electric switch included in a circuit with the battery and electric light bulb, said switch comprising a pivoted lever, a spring for moving the lever in one direction, and a coacting terminal extending from the aforementioned disk at one side of the axis thereof, the end of the lever coacting with the terminal being widened, whereby said terminal may be adjusted by turning the tube and disk so as to require a more or less pull on the lever for closing the switch and moved beyond the throw of the lever to prevent closing of the switch, the line carrying the hook being attached to the lever for operating the same against the action of the spring.

5. A float for fishing lines comprising a casing made up of two sections detachably connected together by a water tight joint, the lower section of the casing being tapered downwardly, a tube to receive an electric battery, an electric light bulb secured to the casing and exposed to provide a signal light, a disk of resilient material secured to the lower end of the tube to frictionally engage the tapered portion of the casing for supporting said tube centrally therein and for turnable movement, and an electric switch included in a circuit with the battery and electric light bulb, said switch comprising a pivoted spring-actuated lever and a terminal extending from the aforementioned disk at one side of the axis thereof, whereby said terminal may be adjusted with respect to the spring-actuated lever to require a more or less pull on said lever to close the switch and movable beyond the throw of the lever to maintain an open switch; the operating end of the lever to which the line carrying the hook is attached being in the form of a loop extending partly around the tapered lower end of the casing and limited in its movement by engagement with said casing to thereby limit the throw of the switch lever with respect to the adjustable terminal.

JEFFERSON D. WALLACE.
MERLE V. SULLENGER.